Patented Dec. 15, 1925.

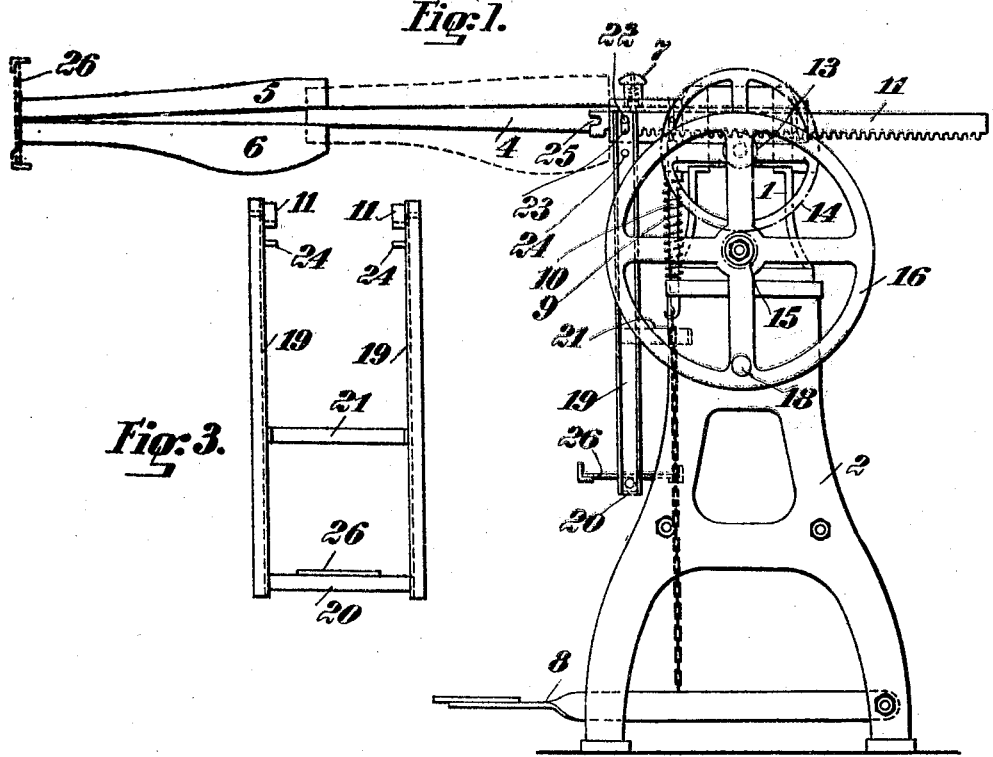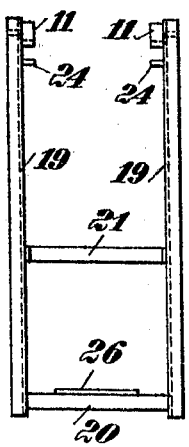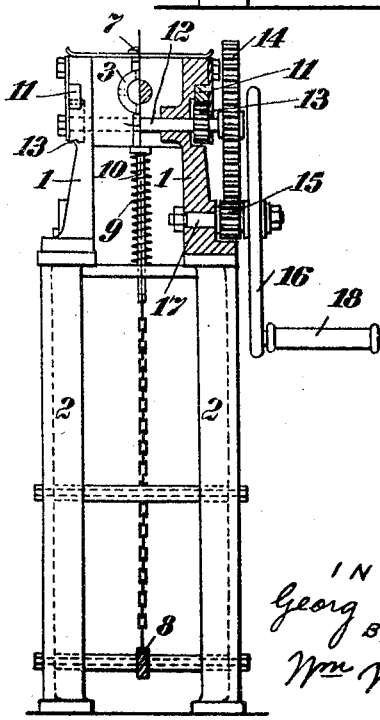

1,565,276

UNITED STATES PATENT OFFICE.

GEORG HÖPPNER, OF NEUKOLLN, GERMANY.

MACHINE FOR SHAPING LEATHER LEGGINGS.

Application filed September 12, 1923. Serial No. 662,201.

*To all whom it may concern:*

Be it known that I, GEORG HÖPPNER, a citizen of the German Empire, residing at Neukolln, Germany, have invented certain new and useful Improvements in a Machine for Shaping Leather Leggings, of which the following is a specification.

This invention relates to a machine for manufacturing leather leggings, which manufacture has heretofore in general been effected by a series of operations performed by hand; for example, the chief hitherto known method of manufacturing such leggings has consisted in cutting a piece of leather into a suitable shape and sewing it into a tube which was thereafter placed moist on the sections of the shaper, a wedge being driven between the said sections for the purpose of tightly stretching the legging on the said shaper and thus giving the said legging the desired shape. The legging was left on the shaper until completely dry.

This invention provides a machine for carrying out the said operations, by the aid of which the manufacture of leggings is greatly improved, since these operations are rendered easier and simpler than hitherto.

A constructional example of the machine according to the invention is illustrated in the accompanying drawings in which—

Figure 1 is a side elevation.

Figure 2 is a partially sectional end elevation, and

Figure 3 is an elevation of the abutment member for the shaper of the machine.

The frame 1, supported on stands 2 carries a horizontal spindle provided with a sleeve-like head 3 adapted to receive the wedge 4 of the shaper to which belongs the sections 5 and 6. The wedge has a trunnionlike extension gripped in the holder 7 for the purpose of holding the said wedge in position. The spindle may be turned into and locked in the desired position by means of a locking device which may be released by a treadle 8 and which is controlled by a spring 9. Two tooth racks 11 are mounted in the frame 1, parallel to the spindle, that is to say horizontal, the said racks being moved endwise with the aid of the gears 13, 14, 15 and of the shaft 12. The abutment member comprises the lateral frame bars 19, 19, the transverse abutment 20 and the cross-tie 21. The said member is pivoted on the pins 22 of the ends of the racks and engage elongated pivot holes or slots 23 of the frame bars 19 so that the abutment member, when in the horizontal position, may be shifted the length of the said slots for the purpose of causing the pin 24 to engage notches 25 of the racks and thus firmly holding the said member in the horizontal position.

As hitherto customary, the leather legging is cut, sewn into a tube, moistened, and passed over the sections 5 and 6 of the shaper. After the wedge 4 is mounted in the sleeve head of the spindle, the racks and the abutment member suspended therefrom are moved to the left by means of the crank handle 18. The two sections of the shaper with the legging around them are slipped over the end of the wedge which thus lies between the said two sections. The abutment member is then moved into the horizontal position, in which the plate 26, secured to the transverse abutment, comes against the free end of the shaper. The crank handle 18 is now operated for the purpose of moving the two sections of the shaper and the legging over the wedge. The leather is now stretched taut owing to the two sections being forcibly moved apart. The progress and results of the stretching operation may be watched by turning the shaper about its longitudinal axis through the medium of the releasing device 8, 9, 10. The wedge now driven right home into the shaper, is removed together with the latter from the machine by releasing the holder 7 and turning the crank handle in the opposite direction to move the racks backwards. The machine is now ready to receive the following legging and shaper.

What I claim is:—

1. A machine for shaping leather leggings comprising a frame, a spindle mounted therein, a holder on said spindle, a wedge held by said holder, a two-part shaper adapted to be carried by said wedge, and an abutment member carried by said frame for forcibly moving the shaper, enclosed by the legging, over the wedge.

2. A machine for shaping leather leggings comprising a frame, a spindle mounted therein, a holder on said spindle, a wedge held by said holder, a two-part shaper adapted to be carried by said wedge, an abutment member carried by said frame for forcibly moving the shaper, enclosed by the legging, over the wedge, and means for operating said member.

3. A machine for shaping leather leggings comprising a frame, a spindle horizontally mounted therein, a holder on said spindle, a wedge held by said holder, a two-part shaper adapted to be carried by said wedge, and an abutment member carried by said frame for forcibly moving the shaper, enclosed by the legging, over the wedge and axially of the spindle.

4. A machine for shaping leather leggings comprising a frame, a spindle mounted therein, a holder on said spindle, a wedge held by said holder, a two-part shaper adapted to be carried by said wedge, an abutment member carried by said frame and adapted to engage said shaper, toothed racks operatively connected to the abutment member, and means for actuating the racks to draw the shaper, enclosed by the leggings, over the wedge.

5. A machine for shaping leather leggings comprising a frame, a spindle rotatably and adjustably mounted in a horizontal position therein, a sleeve on said spindle, a wedge held by said sleeve, a two-part shaper on said wedge, an abutment member carried by said frame, means to permit of the movement of said member into contact with said shaper, and means for moving said shaper over said wedge.

6. A machine for shaping leather leggings comprising a frame, a spindle rotatably and adjustably mounted in a horizontal position therein, a holder on said spindle, a wedge held by said holder, a two-part shaper adapted to be carried by said wedge, an abutment member carried by said frame and adapted to engage said shaper, means for actuating said member to draw the shaper, enclosed by the leggings, over the wedge, and means for locking said spindle in the desired position.

7. A machine for shaping leather leggings comprising a frame, a spindle rotatably mounted in a horizontal position therein, a holder on said spindle, a wedge held by said holder, a two-part shaper adapted to be carried by said wedge, a pair of toothed racks located one on either side of the spindle, an abutment member pivotally connected to said racks and normally occupying a vertical position, co-operating locking means carried by the member and rack for retaining said member in a horizontal position engaging said shaper, and means for moving said racks to force said shaper, enclosed by the legging, over said wedge.

8. A machine for shaping leather leggings comprising a frame, a spindle rotatably mounted in a horizontal position therein, a holder on said spindle, a wedge held by said holder, a two-part shaper adapted to be carried by said wedge, a pair of toothed racks located one on either side of the spindle, an abutment member pivotally connected to said racks and normally occupying a vertical position, co-operating locking means carried by the member and rack for retaining said member in a horizontal position engaging said shaper, and gearing for moving said racks to force said shaper, enclosed by the legging, over said wedge.

9. In a machine for shaping leggings, a movable two-part shaper enclosed by the legging, a wedge fixed with relation thereto, an abutment member engaging said shaper, and means for retracting said member with relation to the wedge to force said shaper over said wedge.

In testimony whereof I affix my signature.

GEORG HÖPPNER.